United States Patent
Ives

(10) Patent No.: US 9,193,474 B2
(45) Date of Patent: Nov. 24, 2015

(54) SIGNAL TRANSMISSION VIA CURRENT MODULATION OF POWER INPUT

(71) Applicant: HAMILTON SUNDSTRAND CORPORATION, Charlotte, NC (US)

(72) Inventor: Kyle Stephen Ives, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 58 days.

(21) Appl. No.: 13/911,461

(22) Filed: Jun. 6, 2013

(65) Prior Publication Data

US 2014/0361910 A1  Dec. 11, 2014

(51) Int. Cl.
G08B 21/00 (2006.01)
B64D 45/00 (2006.01)
H04B 3/54 (2006.01)

(52) U.S. Cl.
CPC *B64D 45/00* (2013.01); *H04B 3/54* (2013.01); *H04B 3/542* (2013.01); *H04B 2203/547* (2013.01); *H04B 2203/5412* (2013.01); *H04B 2203/5445* (2013.01)

(58) Field of Classification Search
None
See application file for complete search history.

(56) References Cited

U.S. PATENT DOCUMENTS

| | | | |
|---|---|---|---|
| 3,977,245 A | 8/1976 | Clark et al. | |
| 4,106,007 A * | 8/1978 | Johnston et al. | 375/259 |
| 4,365,506 A | 12/1982 | Hyde | |
| 4,885,795 A | 12/1989 | Bunting et al. | |
| 5,515,038 A | 5/1996 | Smith | |
| 5,652,755 A * | 7/1997 | Carey | 714/811 |
| 6,266,545 B1 * | 7/2001 | Backman et al. | 455/572 |
| 7,170,394 B2 * | 1/2007 | Chandler et al. | 340/12.32 |
| 8,704,654 B1 * | 4/2014 | Krasowski et al. | 340/538 |
| 2002/0024426 A1 | 2/2002 | Latham et al. | |
| 2005/0162129 A1 | 7/2005 | Mutabdzija et al. | |
| 2006/0202854 A1 * | 9/2006 | Spencer | 340/870.02 |
| 2011/0125432 A1 * | 5/2011 | Pomerantz et al. | 702/62 |
| 2014/0159659 A1 * | 6/2014 | Nosaka | 320/109 |
| 2014/0203952 A1 * | 7/2014 | Harrison et al. | 340/945 |
| 2014/0361880 A1 * | 12/2014 | Burton et al. | 340/12.32 |

FOREIGN PATENT DOCUMENTS

EP  1134910 A2  9/2001

OTHER PUBLICATIONS

Extended European Search Report for EP Application No. 14171489.9-1855, dated Aug. 29, 2014, pp. 1-6.

* cited by examiner

*Primary Examiner* — Julie Lieu
(74) *Attorney, Agent, or Firm* — Cantor Colburn LLP

(57) ABSTRACT

A system, method, and computer readable medium directed to communication with a remote component in an aircraft environment are described. The system includes the remote component in the aircraft environment to control a single phase alternating or direct current input drawn from a constant voltage power source, and a controller in the aircraft environment configured to monitor the current input to the remote component and determine a message from the remote component based on a current pattern in the current input.

9 Claims, 8 Drawing Sheets

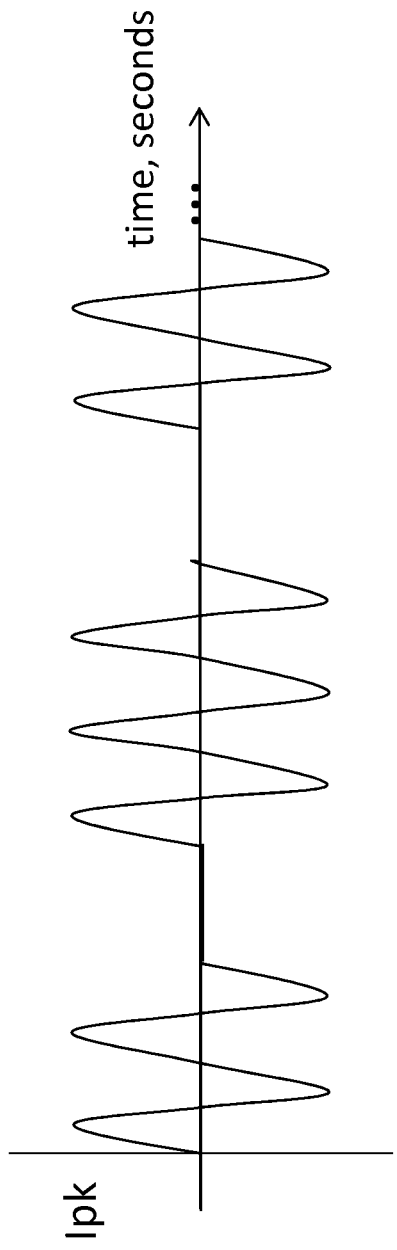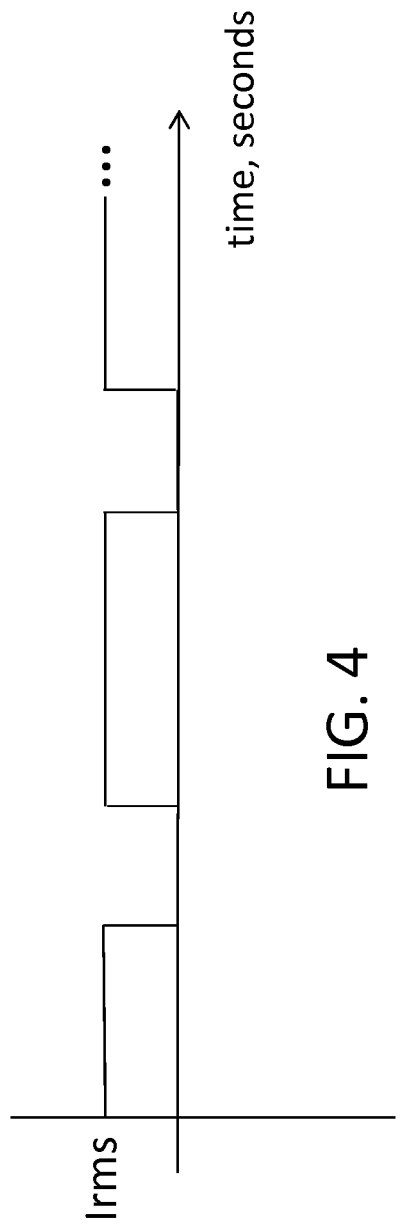
FIG. 3
FIG. 4

SIGNAL TRANSMISSION VIA CURRENT MODULATION OF POWER INPUT

BACKGROUND OF THE INVENTION

Exemplary embodiments pertain to the art of signal transmission.

In many systems that include multiple components, several of those components may be remote such that they are not visible or accessible to an operator. In these systems, the ability to receive communication regarding the health or other information about the remote components may be desirable. Such information may facilitate more reliable operation of the system through better control of the remote components, for example. However, current forms of receiving such information involve the addition of discrete signal wires or communication buses. For example, the additional wires may present issues with respect to added weight (e.g. in aircraft systems) and/or technical complexity.

BRIEF DESCRIPTION OF THE INVENTION

Disclosed according to an embodiment is a system to communicate with a remote component located in an aircraft environment, the system including the remote component disposed in the aircraft environment configured to control a single phase alternating current or direct current input drawn from a constant voltage power source; and a controller disposed in the aircraft environment configured to monitor the current input to the remote component and determine a message from the remote component based on a current pattern in the current input.

According to another embodiment, a method of communicating within a system, located in an aircraft environment, including a remote component includes generating, by the remote component disposed in the aircraft environment, a current pattern within current input to the remote component from a constant voltage power source of the system; monitoring, by a controller disposed in the aircraft environment and remote to the remote component, the current input to detect the current pattern, the current input being single phase alternating current or direct current; and associating, using a memory device, the current pattern with a corresponding message from the remote component.

Also disclosed according to yet another embodiment is a non-transitory computer readable medium storing instructions therein which, when processed by a processor, cause the processor to implement a method of receiving communication from a remote component of a system located in an aircraft environment. The method includes monitoring a single phase alternating current or direct current input from a constant voltage power source to the remote component; identifying a current pattern in the current input; and associating the current input with a corresponding message from the remote component.

BRIEF DESCRIPTION OF THE DRAWINGS

The following descriptions should not be considered limiting in any way. With reference to the accompanying drawings, like elements are numbered alike:

FIG. 3 is an exemplary supply current when the power source supplies alternating current to the remote component;

FIG. 4 is a current pattern resulting from the exemplary supply current shown in FIG. 3;

DETAILED DESCRIPTION OF THE INVENTION

A detailed description of one or more embodiments of the disclosed apparatus and method are presented herein by way of exemplification and not limitation with reference to the Figures.

As noted above, traditional communication (via wires or communications buses) with remote components of a system may present issues related to weight and complexity, for example. These issues are prevalent in aircraft systems. For example, knowing the status of lights disposed on the outside of an aircraft may be desirable but the addition of wires to those lights may be impractical. Embodiments of the system and method described herein involve the use of existing controlled power input lines to the remote components for communication. Specifically, embodiments detail the remote component controlling its current demand (e.g., by controlling resistance) from a constant voltage source and a controller monitoring the current draw to receive communication from the remote component.

Figure 1:
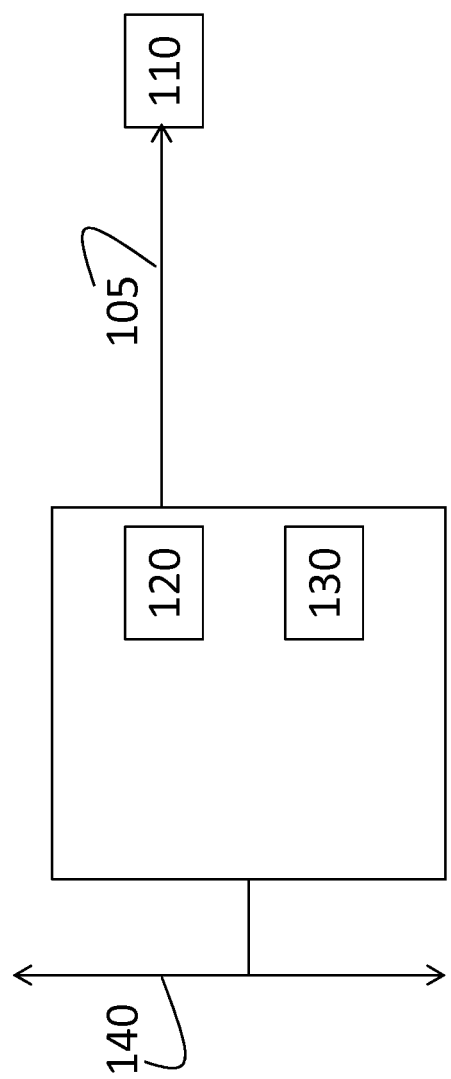
FIG. 1 is a block diagram of a system according to an embodiment of the invention.

FIG. 1 is a block diagram of a system according to an embodiment of the invention. The system includes the remote component 110 supplied with power from a constant voltage power source 120. In an aircraft environment, for example, the supplied power may be single phase alternating current or direct current power. Although one remote component 110 is shown and discussed with reference to FIG. 1 for explanatory purposes, in various embodiments of the invention, the system may include any number of remote components 110 that communicate as discussed below. Communication by the remote component 110 via modulation of the power supplied from the power source 120 may be self-initiated. That is, the remote component 110 conveys information (e.g., due to a change in status of a parameter, due to an event trigger, due to a defined time trigger) without being prompted. A controller 130, which may be housed with the power source 120 as shown in FIG. 1 or which may be a separate component itself, monitors the input current 105 to the remote component 110. The controller 130 detects a current pattern 250 (FIG. 2) in the input current 105 to the remote component 110, determines a message 260 (FIG. 2) corresponding with the current pattern 250, and transmits the message 260 to other components of the system via a communication bus 140. Exemplary messages 260 may convey health status, temperature, pressure, and flow information related to the remote component 110.

Figure 2:
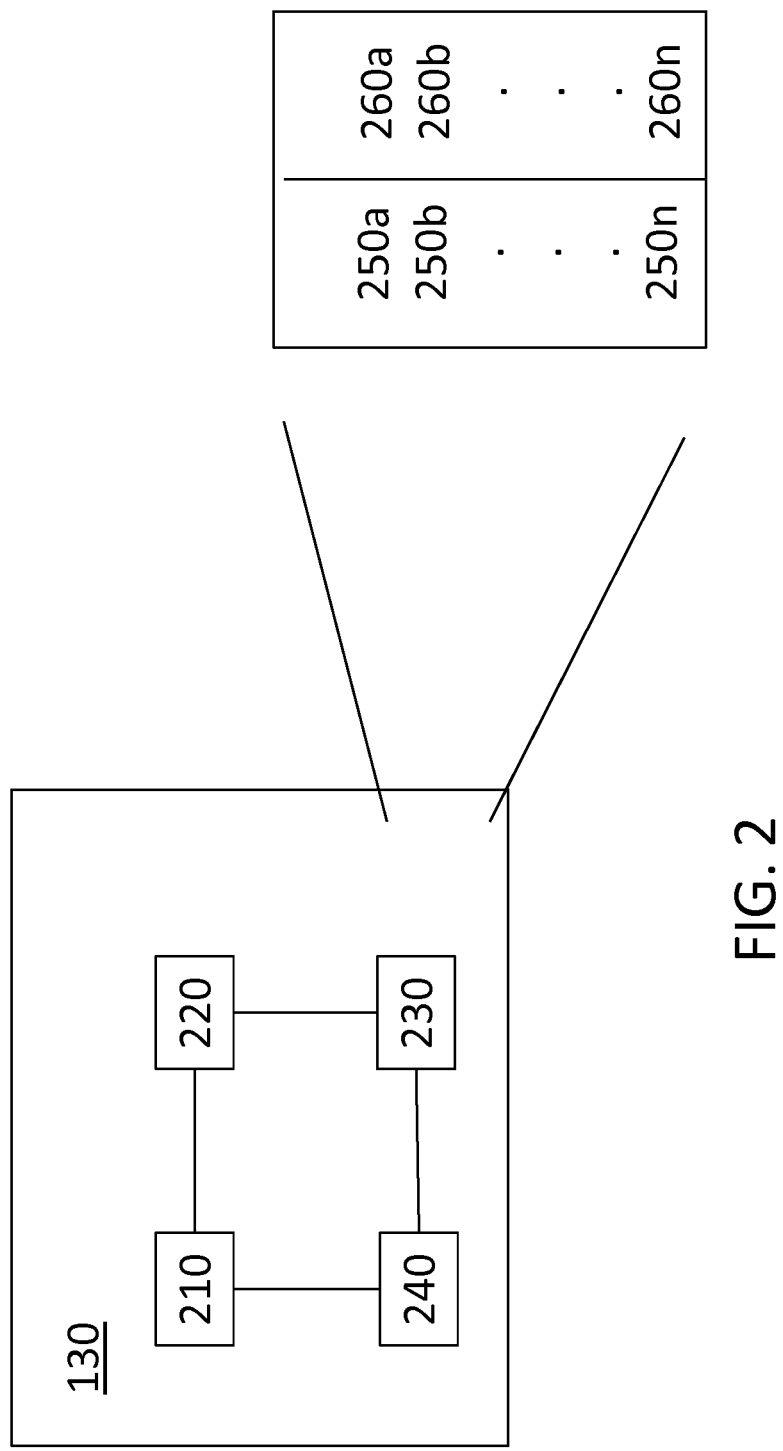
FIG. 2 details the controller shown in FIG. 1 according to an embodiment of the invention.

FIG. 2 details the controller 130 shown in FIG. 1 according to an embodiment of the invention. The controller 130 includes an input interface 210, one or more processors 220, one or more memory devices 230, and an output interface 240. The controller 130 input interface 210 receives the current pattern 250 being sent from the power source 120 and modulated by the remote component 110. The power source 120 may supply alternating current (ac) or direct current (dc) to the remote component 110. The processor 220 identifies the current pattern 250 and matches it with a corresponding message 260 based on instructions and an association stored in the memory device 230. For example, as shown in FIG. 2, the memory device 230 may store a look-up table with current patterns 250a-250n and corresponding messages 260a-260n. The output interface 240 is used to communicate the message 260 corresponding with the identified current pattern 250 over the communication bus 140.

When the power source 120 supplies alternating current (ac, the controller 130 monitors the root mean square value of the current (Irms) in order to ascertain the current pattern 250 and corresponding message 260. FIG. 3 is an exemplary supply current when the power source 120 supplies ac to the remote component 110. In this case, the controller 130 determines the root mean square value of the current (Irms) as the current pattern 250. Thus, FIG. 4 is the current pattern 250 resulting from the exemplary supply current shown in FIG. 3. When the power source 120 supplies direct current (dc) or ac, the remote component 110 may control when the supply current from the power source 120 is turned on or turned off (i.e. generate current-on and current-off pulses) as a way to generate the current pattern 250. The remote component 110 includes one or more processors (not shown) that control the current demand from the constant voltage power source 120 to generate the current pattern 250. In alternate embodiments, the remote component 110 may also generate a current pattern 250 in other ways. Exemplary current patterns 250 and messages 260 are discussed below for explanatory purposes, but the examples are not intended to limit the types of current patterns 250 or messages 260 contemplated as embodiments of the invention.

Figure 5:
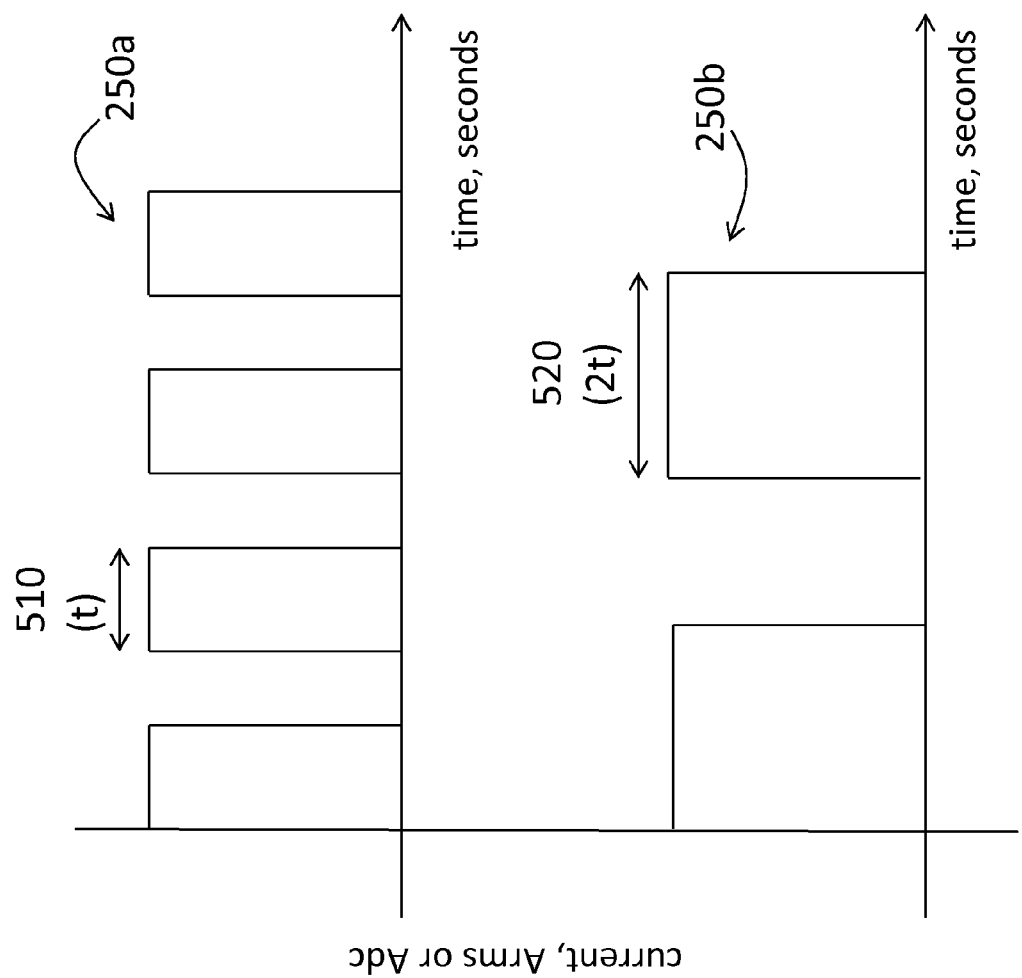
FIG. 5 depicts current patterns that convey a discrete status as the message according to an embodiment of the invention.

FIG. 5 depicts current patterns 250a, 250b that convey a discrete status as the message 260 according to an embodiment of the invention. In the exemplary embodiment shown in FIG. 5, the two states represented by the two current patterns 250a, 250b are distinguishable based on the length of time that the remote component 110 is drawing current (periods 510 and 520). In this example, the remote component 110 is drawing current for a period 520 that is twice as long to generate the current pattern 250b than the period 510 to generate current pattern 250a. Other variations in the periods 510, 520 of the current patterns 250a, 250b are also possible. The current pattern 250a may correspond to discrete logic 1, which conveys a message 260 of "health status ok," while current pattern 250b may correspond to discrete logic 0, which conveys a message 260 of "health not ok," or vice versa. Other discrete messages 260 may be conveyed in this way, as well. The controller 130, upon matching the monitored current pattern (250a or 250b) with the corresponding message 260, may set a corresponding status bit on the communication bus 140.

Figure 6:
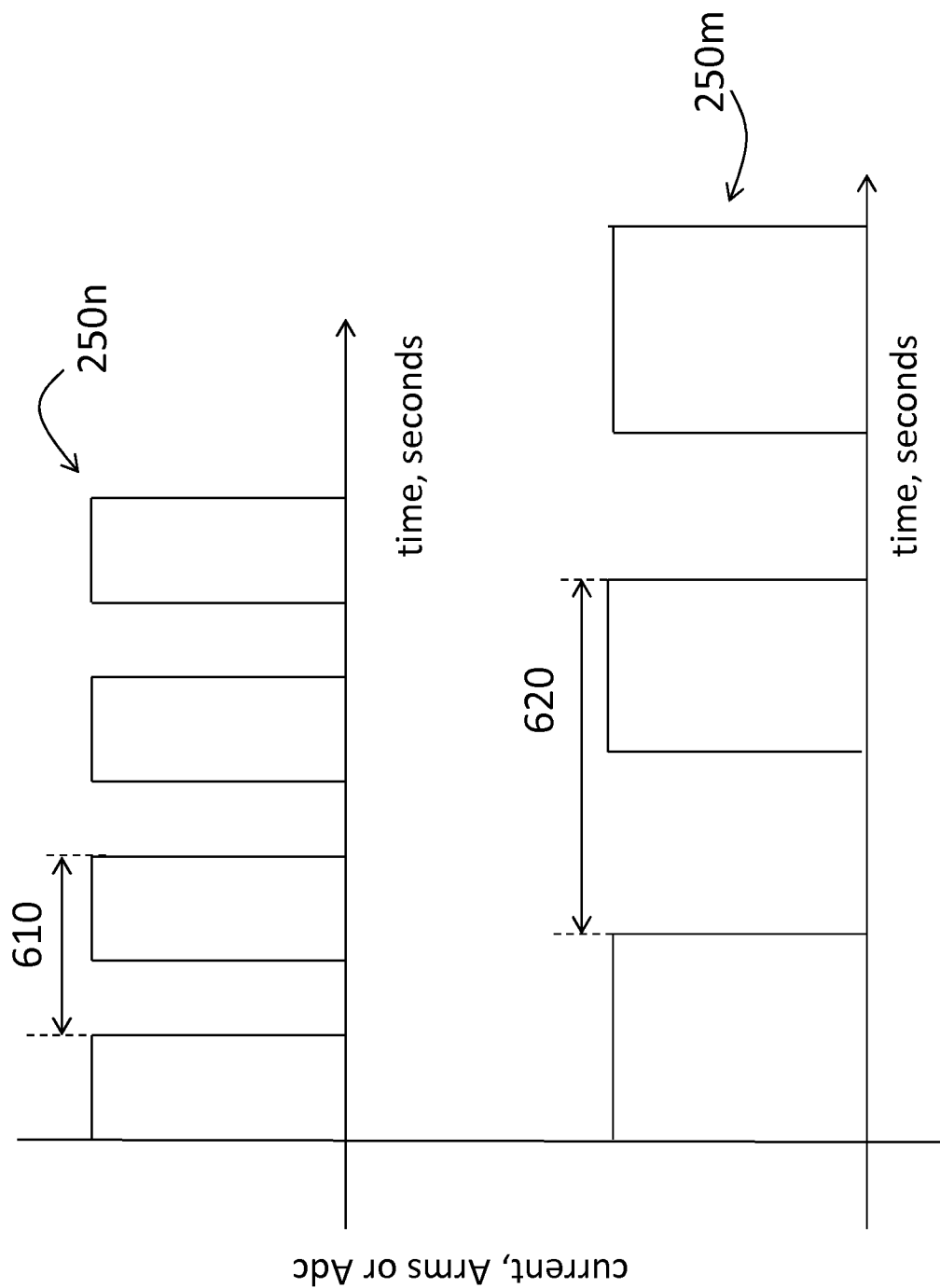
FIG. 6 depicts current patterns that convey an analog value as the message according to an embodiment of the invention.

FIG. 6 depicts current patterns 250n, 260m that convey an analog value as the message 260 according to an embodiment of the invention. In this example, the length of time that the remote component 110 is not drawing current (distance between current-off pulses 610, 620 in seconds) at the remote component 110 is proportional to an analog value being conveyed as the message 260. For example, the distance 610 in current pattern 250n may be proportional to a particular temperature or pressure value while the distance 620 in current pattern 250m is proportional to a different temperature or pressure value. As should be clear from the descriptions of the exemplary current patterns 250 in FIGS. 5 and 6 that the current patterns 250a, 250b in FIG. 5 may be used to convey analog values rather than discrete states while the current patterns 250n, 250m in FIG. 6 may be used to convey discrete states rather than analog values in alternate embodiments.

Figure 7:
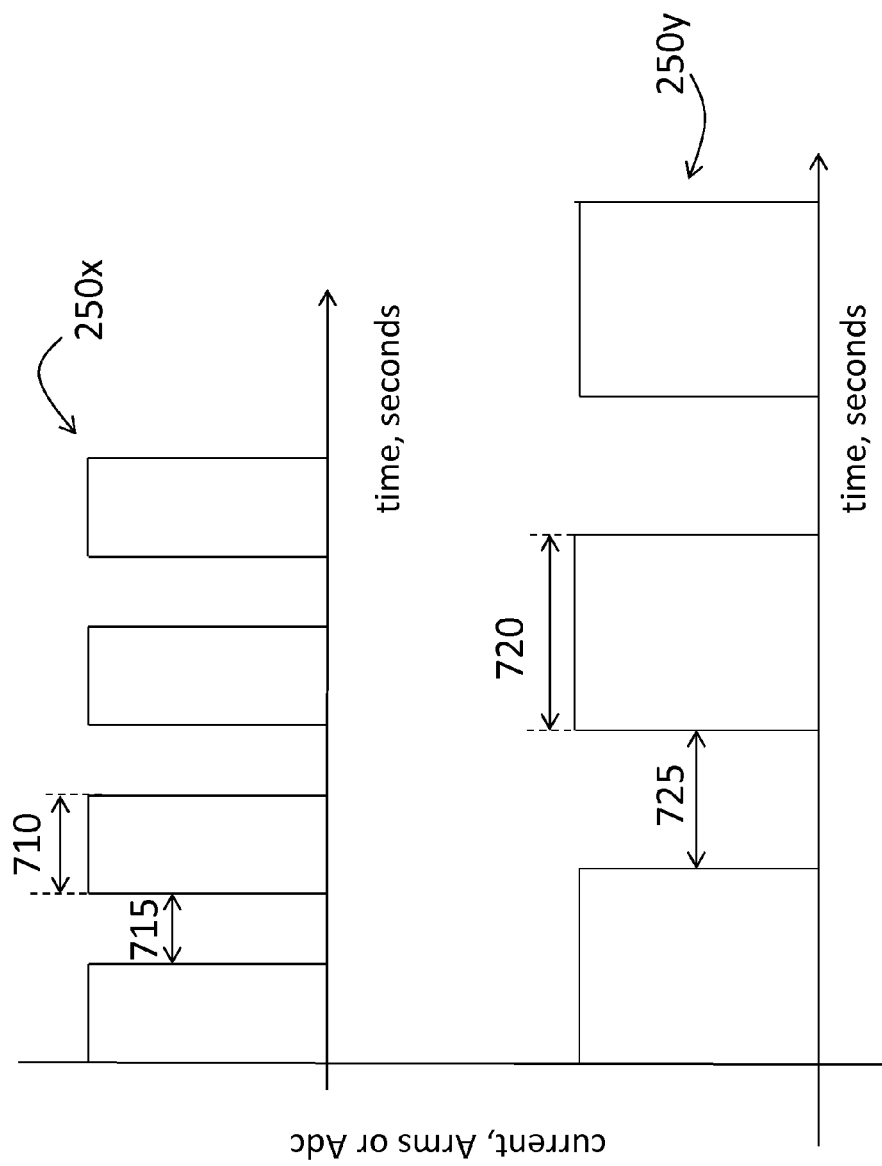
FIG. 7 depicts current patterns that convey an analog value as the message according to another embodiment of the invention.

FIG. 7 depicts current patterns 250 that convey an analog value as the message 260 according to another embodiment of the invention. In the embodiment shown by FIG. 7, the ratio between the length (710, 720) of a current-on pulse and the length (715, 725) of a current-off pulse is used to convey a message 260. For example, the ratio of the lengths 710 to 715 may convey an air flow while the ratio of the lengths 720 to 725 may convey a different air flow as the message 260. As should be clear from the examples, any current pattern 250 generated by the remote component 110 may be used to convey any message 260 from the remote component 110 to the controller 130 as long as both the remote component 110 and the controller 130 store a prior correspondence between the same current patterns 250 and respective messages 260.

Figure 8:
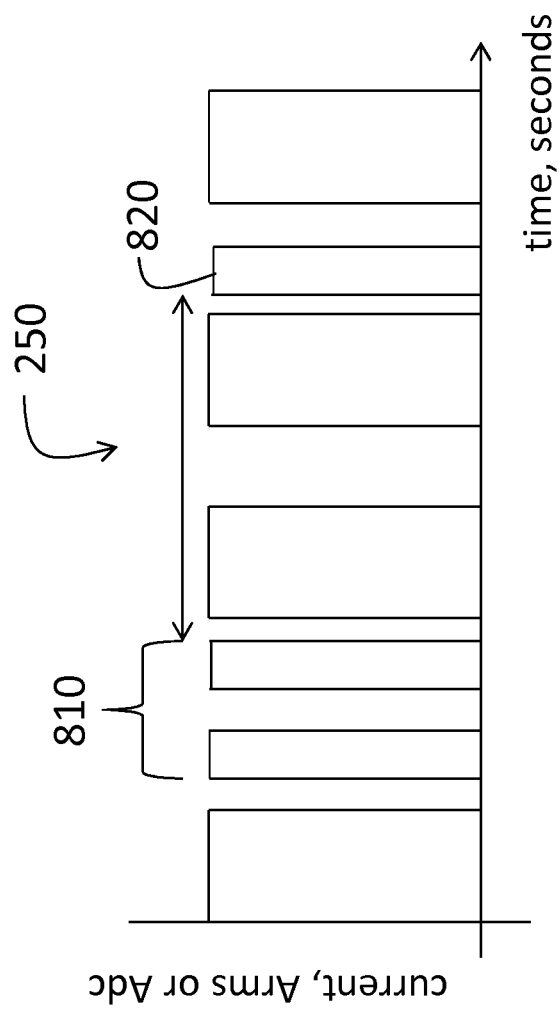
FIG. 8 depicts message start and stop signals in a current pattern according to an embodiment of the invention.

FIG. 8 depicts message start 810 and stop 820 signals for a current pattern 250 according to an embodiment of the invention. The start 810 signal alerts the controller 130 to note the current pattern 250 in the supply current following the start 810 signal. Once the controller 130 encounters the stop 820 signal, the controller 130 matches the current pattern 250 to a corresponding message 260. Depending on the types of current patterns 250 stored for recognition and message 260 match in the controller 130, the use of the start 810 and stop 820 signals may preclude inadvertent messages 260 from being conveyed through the normal operation of the remote component 110.

Figure 9:
FIG. 9 is an exemplary flow diagram of a method of communicating with a remote component according to an embodiment of the invention.

FIG. 9 is an exemplary flow diagram of a method of communicating with a remote component according to an embodiment of the invention. At block 910, the remote component 110 generating a current pattern 250 by controlling current draw may be through combinations of current-on and current-off pulses, as shown in the examples discussed above. Generating the current pattern 250 may include generating a start 810 signal preceding and a stop 820 signal immediately following the current pattern 250 to isolate the current pattern 250 for the controller 130. The controller 130 detecting the current pattern 250, at block 920, involves the controller 130 monitoring the supply current from the power source 120 to the remote component 110. The detecting may include detecting the start 810 and stop 820 signals. At block 930, the controller matching the current pattern 250 with a message 260 involves the controller using correspondence information stored in the memory device 230. The correspondence information may be stored in the form of a look-up table, for example. After identifying the message 260 corresponding to the detected current pattern 250, the controller 130 communicating the message 260 to other parts of the system may be via the communication bus 140. For example, the controller 130 may set a status bit on the communication bus 140 indicating a state of discrete logic conveyed by the message 260.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A system to communicate with a remote component located in an aircraft environment, the system comprising:

the remote component disposed in the aircraft environment configured to control a single phase alternating or direct current input drawn from a constant voltage power source to generate a current pattern; and a controller disposed in the aircraft environment configured to monitor the current input to the remote component and determine a message from the remote component based on the current pattern in the current input and on a stored correspondence between the current pattern and the message, wherein the remote component controls a current demand to turn on and off in a specified pattern to generate the current pattern.

2. The system according to claim 1, wherein the current input is ac, and the controller monitors root-mean-squared value of current input.

3. The system according to claim 1, wherein the specified pattern corresponds with the message.

4. The system according to claim 1, wherein the remote component generates a start signal preceding the current pattern and a stop signal immediately following the current pattern.

5. A method of communicating within a system, located in an aircraft environment, including a remote component, the method comprising:

generating, by the remote component disposed in the aircraft environment, a current pattern within current input to the remote component from a constant voltage power source of the system;

monitoring, by a controller disposed in the aircraft environment and remote to the remote component, the current input to detect the current pattern, the current input being single phase alternating or direct current; and associating, based on a correspondence between the current pattern and a message stored in a memory device, the current pattern with the message from the remote component, wherein the generating the current pattern includes the remote component controlling the current input to turn on and off in a specified pattern.

6. The method according to claim 5, wherein the generating the current pattern includes generating a start signal preceding the current pattern and a stop signal immediately following the current pattern.

7. The method according to claim 5, wherein the generating the current pattern includes the remote component controlling a distance between current-on pulses.

8. The method according to claim 5, wherein the generating the current pattern includes the remote component controlling a distance between current-off pulses.

9. The method according to claim 5, wherein the generating the current pattern includes the remote component controlling a ratio of time that the current input draw is on to time that the current input draw is off.

* * * * *